May 18, 1954

E. W. TODD 2,678,596

IMPLEMENT TRACTOR HITCH

Filed March 5, 1953

INVENTOR.
EVERETT W. TODD
BY James E. Nilles

INVENTOR.
EVERETT W. TODD
BY James E. Nilles
Atty.

May 18, 1954  E. W. TODD  2,678,596
IMPLEMENT TRACTOR HITCH
Filed March 5, 1953  3 Sheets-Sheet 3

INVENTOR.
EVERETT W. TODD.
BY James E. Nilles
Atty.

Patented May 18, 1954

2,678,596

UNITED STATES PATENT OFFICE 2,678,596

IMPLEMENT TRACTOR HITCH

Everett W. Todd, Racine, Wis., assignor to The Massey-Harris Company, Racine, Wis., a corporation of Maryland Application March 5, 1953, Serial No. 340,508

7 Claims. (Cl. 97—46.59)

This invention relates to hitches for that type of implement which is mounted directly on and carried by a tractor.

This application is a continuation-in-part of my prior application entitled "Hitches," Serial Number 186,549, filed September 25, 1950, now abandoned.

In a hitch connection of the type having a single point of connection to the tractor, if the hitch is properly designed the plow drops into the ground point first and quickly reaches its working depth. However, with an upper and lower link connection the plow drops to the ground in a substantially horizontal position and is raised the same way, and therefore it takes considerable time for the plow to find its working depth or conversely, free itself from the ground when raised.

An object of this invention is to provide a hitch which is adapted to tilt agricultural implements connected therewith, as it lifts and lowers the same, to change the ground working attitude of the implement so the implement, such as a plow, will enter the ground point first, aiding the natural suction effect of the plow and thus allowing the plow to quickly reach its working depth; or when it is desired to decrease the depth or raise the plow out of the ground, the point will be directed upwardly, thus the plow will quickly work its own way out of the ground instead of being torn bodily from the soil.

An object of this invention is to provide a hitch which will automatically maintain the correct angle of attack on the implement regardless of the direction of movement of the implement in a vertical direction and regardless of the depth at which it is working.

An object of this invention is to provide a hitch for mounting earth working implements to a tractor which is very efficient in operation and requires no attention from the operator of the tractor to carry out the functions for which it was designed.

Other objects and advantages of this invention will become apparent as the description proceeds.

Referring now to the drawings:

Figure 3 is an elevation view taken on line 3—3 of Figure 2, showing the powerlift arms and the lost motion connection.

Figure 4 is a rear view of the elements of Figure 3.

Figure 5 shows the cam member as shown in Figures 1 and 2.

Figure 6 is a plan view of the cam member as attached to the tractor.

Figure 1:
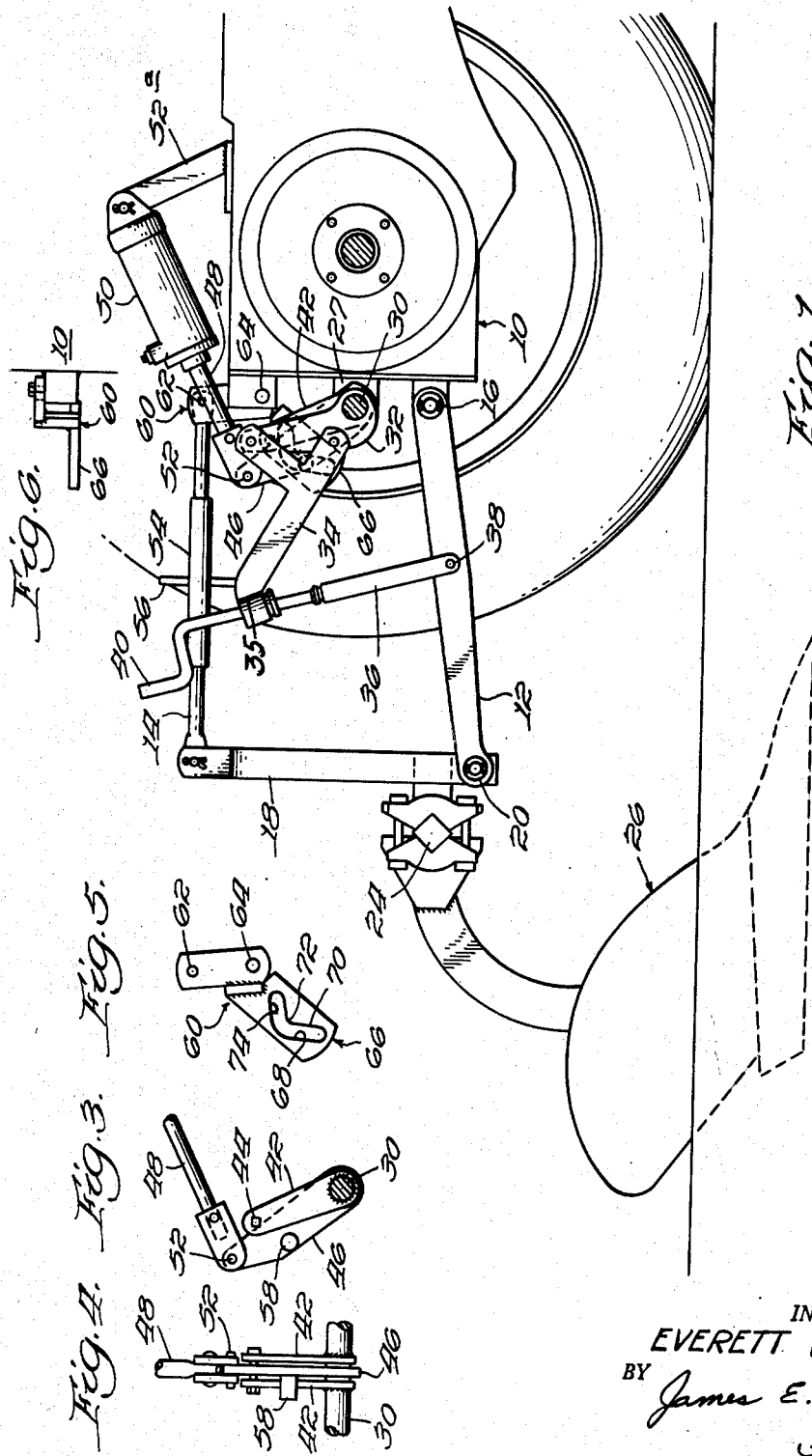
Figure 1 is an elevational view of the hitch as attached to the tractor, with the right hand wheel of the tractor removed.
Figure 2:
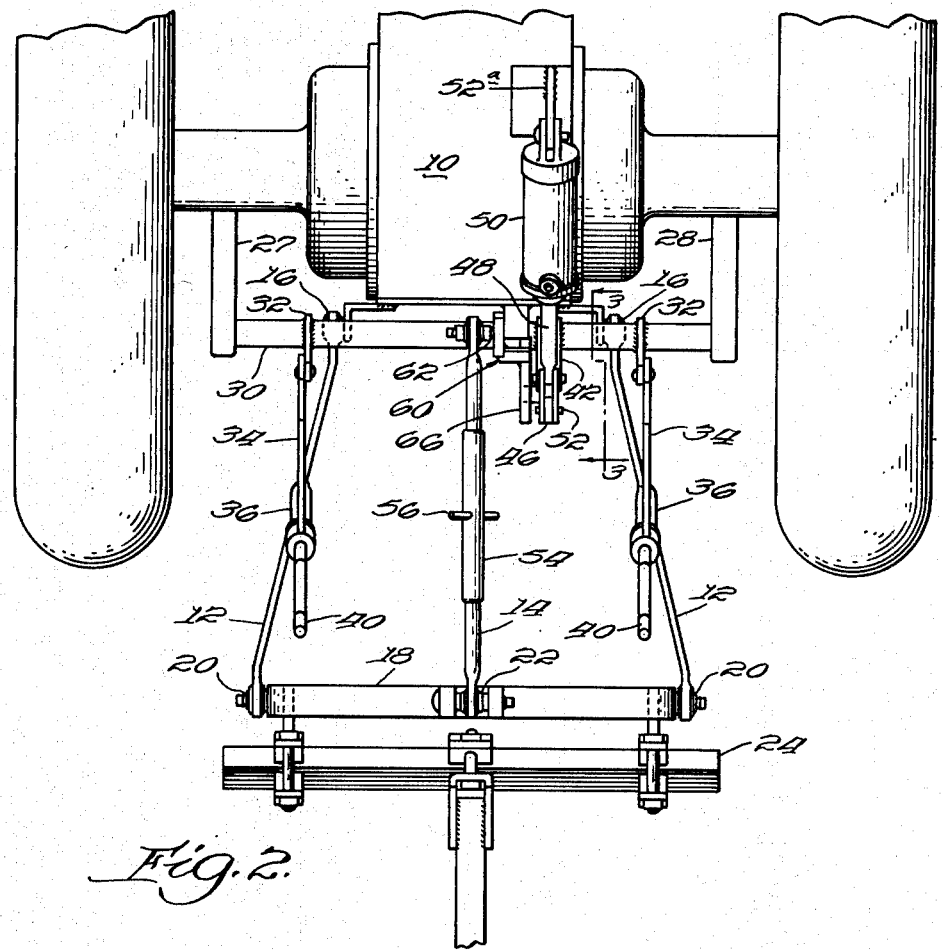
Figure 2 is a plan view of the device.

In Figure 1 the tractor transmission frame is designated generally by the numeral 10. The hitch proper consists of two lower arms 12 and an upper arm 14. The forward end of the lower arms are connected to the tractor frame by means of universal joints, such as ball and socket joints as at 16, or these joints may also be loose pivotal connections. The rear ends of the three hitch link members are connected together by an A frame 18 by universal joints as at 20 and 22. Attached to the lower portion of the A frame is a tool bar 24 to which may be secured various implements such as the plow I have shown here designated generally as 26.

The power lift mechanism is comprised of two rearwardly extending brackets 27 and 28 rigidly secured to the tractor frame in any suitable manner and having rotatably mounted thereon a shaft 30. Rigidly secured to this shaft, preferably by welding, are two arms 32. Links 34 are rigidly attached to these arms 32 and at their outer ends 35 have a universal connection for the reception of links 36 which in turn are pivotally attached to the lower link members 12 as at 38. The arms 36 are adjustable in length for leveling the device by means of threaded crank arms 40 which screw into the lower portion of arm 36 and need no further description here. Another use of these adjusting cranks 40 will be described later.

I will now describe the lost motion connection or free floating feature which connects the double acting hydraulic ram 50 to the rotatable shaft 30. Rigidly secured near the center part of shaft 30 are two arms 42 spaced apart a short distance (see Fig. 3). A bolt 44 connects the upper part of arms 42. Rotatably mounted on shaft 30 and between arms 42 is the power lift arm 46 which is directly connected by rod 48 as at 52 to the piston of the ram 50. Thus it can be seen the plow or other implement when at its working depth is free to rise and also free to fall to an extent determined by the position of the piston. This free floating feature is of course necessary for the correct operation of a plow of this type, i. e., one without gauge wheels. When it is desired to raise the plow, fluid is admitted to the rear of the cylinder by means of a control lever (not shown) and the arm 46 moves forwardly until it comes in contact with bolt 44 thus rotating arms 42 forwardly and begins to raise the hitch through arms 32, 34, and 36. The ram 50 may be attached to the tractor in any suitable manner as by the bracket 52a. This lost motion connection is well known in the art and may be of other types such as lengths of chain connecting the power lift arms.

In the conventional type of three point hitch the working depth of plowing is usually controlled by changing the length of the upper hitch member 14 by means of a threaded sleeve portion 54. It can be seen by lengthening this upper member 14 the point of the plow would be directed upwardly, thus tending to raise the plow out of the ground. Conversely if the upper link member is shortened the plow will be given down suck and the working depth will of course be increased. In the past it has been necessary for the operator of the tractor to vary the depth by stopping and dismounting from the tractor and manually turning handle 56.

Due to the substantial parellelism of arms 12 and 14 the plow rises and falls in a substantially horizontal position. It is desirable, however, to have the plow enter the ground point first for quick and easy penetration. It is also desirable to have the plow leave the ground point first for the same reason and to also save wear and tear on the implement hitch and lifting means.

I will now describe one modification of my invention whereby the upper link member 14 is automatically "lengthened" (moved in an axial direction rearwardly) when it is desired to raise the plow out of the ground or automatically "shortened" (moved in an axial direction forwardly) when it is desired to lower the plow in its working position. Secured to power lift arm 46 is a cam follower or roller 58. The forward end of link 14 is pivotally connected to the upper end of a cam member 60 (see Fig. 1) as at 62. The cam member is pivotally connected intermediate its length to the rear end of the tractor transmission, as at 64. The lower portion of the cam member consists of a plate 66 which has a cam surface 68 cut in it shaped generally as shown in Figure 5. The roller 58 on power lift arm 46 travels in this cam surface 68.

When it is desired to raise the plow from the position shown in Figure 1, the power lift arm 46 starts moving forwardly, thus the roller 58 immediately bears against the forward edge of the lower leg of the cam surface as at 70 and immediately and positively starts to tip the plow in an upward direction by moving link 14 in an axial direction rearwardly. The cam action here is positive and there is no delay whatsoever. When the roller reaches the corner of the cam surface 72 the tilting action of the plow ceases, in other words the plow has attained its maximum upward pitch. At this time the delayed action of the power lift arms 46 and 42 ceases, that is, the arm 46 makes contact with the bolt 44 connecting arms 42 and the plow itself is lifted; but as can now be seen only after the plow is tilted upwardly. Thus the plow comes out of the ground in a natural manner and substantially under its own upward suction effect. Thus when it is desired to either raise the plow out of the ground or merely decrease the working depth, the plow in either instance is first tilted upwardly.

The function of the upper or substantially horizontal leg of the cam surface 74 is to give the plow additional lift or height from the ground for transport position and to return the plow to a substantially horizontal position when in the raised position. The cam accomplishes this by "shortening" link 14 (moving link 14 forwardly in an axial direction, and thereby raising the rear end of the plow. More specifically, when the arm 46 continues forwardly, the roller 58 travels in an arc about the shaft 30 and bears against the upper surface of the cam leg 74. Thus the lower portion of the cam member is forced upwardly, rotating about the point 64. As a result the upper portion of the cam member 60 is forced forwardly, and link 14 moved forwardly in an axial direction, thus raising the rear end of the plow.

As well as for leveling the implement in a transverse direction, the cranks 40 are also used to determine the time during the cam cycle when the power lift arm 46 comes in contact with bolt 44 and actually starts raising the hitch. It is preferable to have the power lift arms 46 and 42 start raising the hitch just before the roller 58 reaches the corner 72 of the cam member. This is when the plow is approximately half way out of the ground. Then the power lift aids the plow in pulling itself out of the ground and by the time the plow has reached the surface the power lift is in full operation and the roller immediately starts to raise the rear end of the plow as it travels in the upper part of the cam surface 74.

Lowering the plow is simply the reverse procedure; after the power lift arms 42 and 46 have lowered the plow to near the surface of the ground, the roller 58 is preferably at the corner 72 of the cam surface. Then, as additional fluid enters the forward end of ram 50, the roller travels through the lower leg of the cam path and bears against the rear side of the leg 70. This pivots the cam member about the point 64, forcing the upper part of the cam forwardly and moving link 14 forwardly in a substantially axial direction, thus effectively "shortening" link 14 and tilting the plow with an excess of down suck. When the desired depth is reached, the operator reverses the ram slightly to relieve the plow bottom of its excess down suck. The lift arm 46 has travelled rearwardly further than arms 42 and thus when the implement is in working position there is no lifting connection between arms 46 and 42. Therefore the plow is free to float in the ground as a properly designed plow of this type should do. The working depth in any range is positively controlled entirely by the hydraulic ram. As previously stated, the plow is lowered into the ground with an excess of suck for quick penetration. When the approximate desired depth is reached the control lever is simply adjusted by the operator, decreasing the suck or pitch of the plow bottom, until the correct depth is obtained. The amount of suck of the plow or the angle of attack can be accurately and quickly changed simply by moving the roller 58 in either direction in the cam leg 70 by means of the hydraulic control lever. It can now be seen a very effective means has been provided for regulating the working depth of the plow.

Link 14 is manually adjustable in length by sleeve 54 for changing the ranges which the plow will work through, that is changing for maximum condition. It is also adjustable so this hitch can be used with different tractors, having different dimensions.

The control lever for the ram (not shown) may be provided with a gauge which is graduated in inches to show the working depth of the plow for any corresponding position of the control lever.

Figure 7:
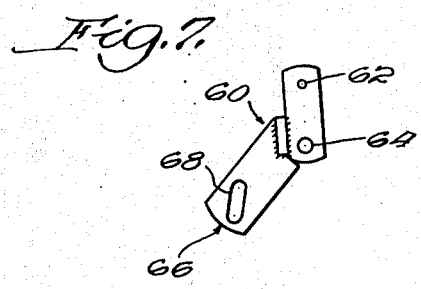
Figure 7 shows a modification of the cam member shown in Figure 5.

Various cam members may be employed with different cam surfaces and come within the scope of this invention. For instance, with the cam as shown in Fig. 7, the additional lifting action of the rear end of the plow is not obtained after the tilting of the plow has taken place. However, Fig. 5 shows a preferred embodiment which gives a very desirable type of action. It is to be understood that I do not wish to be limited to the shape of the cam surface as shown, as slight modification will of course give different action in tilting the implement. Neither should this invention be limited to the form of cam member as shown, as this form was designated for a definite model tractor and to certain space and structural limitations.

Figure 8:
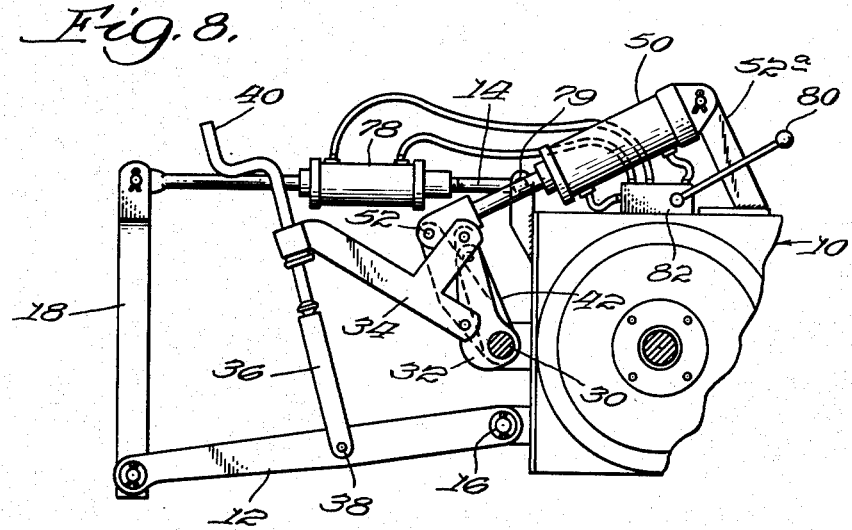
Figure 8 shows another modification of my invention.

Another modification of my invention is shown in Fig. 8 wherein a separate ram 78 is made an integral part of the upper link member 14 and hereinafter referred to as the link ram. The link member 14 is pivotally connected directly to the tractor as at 79. A single control lever 80 is used to operate both rams in order that the tilting of the plow is automatically accomplished when the hitch is raised or lowered. The hydraulic valve 82 is of the delayed action type wherein the lift ram will not operate until after the link ram has been activated and then the increased pressure will cause the lift ram to function. The "sandwich" type of hydraulic valve is well known and needs no further explanation here.

In operation when it is desired to raise the plow from the position shown in Figure 8, the link cylinder 78 will be activated first thus lengthening link 14. Then the lift cylinder will begin to raise the hitch through the arms after the plow has been tilted upwardly. When the hitch has been raised to its uppermost position if it is desired to transport the plow any distance, the control lever may be reversed slightly to again activate the link ram but in the reverse direction. This will shorten the link and raise the rear of the plow for transport position. Further movement of the control lever in this reverse direction will lower the plow into the ground in the excess suck position. While in the working position the plow will float free of the power lift arms and the link ram operated in either direction by the control lever to vary the tilt of the plow in either direction in order to obtain the correct working depth.

Figure 9:
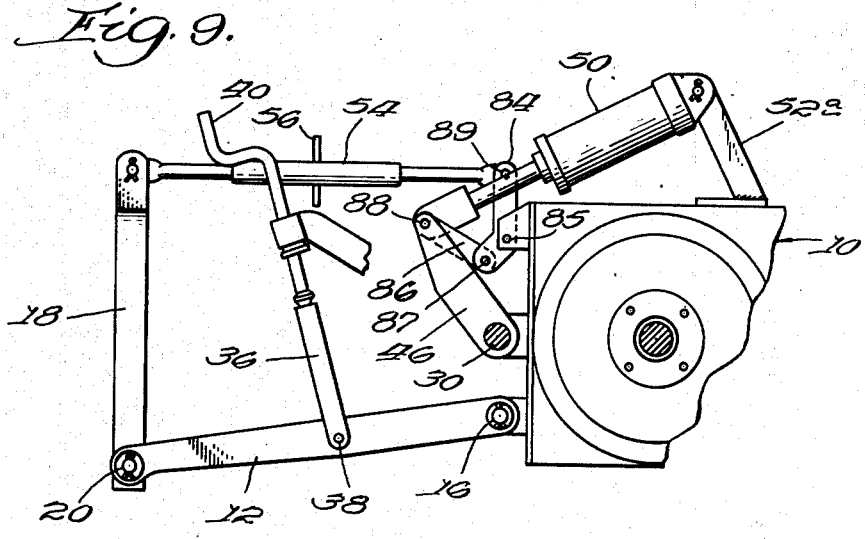
Figure 9 shows still another modification of my invention—omitting the lost motion connection for the sake of clarity.

Another modification of this invention is shown in Fig. 9. The lost motion connection as shown in Figure 3 and power lift arms 32 and 34 are omitted from Figure 9 for the sake of clarity in the drawing. However they would be included in this modification also. A bell crank 84 is pivotally mounted on the tractor as at 85. A link 86 pivotally connects the crank 84 and the power lift arm 46 as at 87 and 88. The upper end of the bell crank is pivotally attached to the upper link 14 as at 89. Therefore axial movement is imparted to the link 14 through the bell crank 84 and link 86. To raise the implement from the working position as shown in Figure 9, the power lift arm 46 rotates forwardly and forces the lower end of the bell crank downwardly through link 86 thus forcing link 14 rearwardly and tilting the implement upwardly. Then the lost motion connection (not shown in this view) takes effect and begins to raise the plow. The additional lifting effect of the rear end of the plow for transport purposes is obtained when the arm 46 continues forwardly and passes the point of connection at 87. After this time further forward movement of the arm 46 will raise the lower end of the bell crank 84 and force link 14 forwardly thus giving action similar to the cam member as shown in Figure 5. When in the working position the plow is free to float due to the lost motion connection and the plow bottom may be tilted in either direction when desired to change the working depth. Of course similar linkages could be employed and fall within the scope of this invention.

It will now be apparent that I have provided a hitch for closely coupling a plow to the tractor in which the use of gauge wheels, or similar devices, is unnecessary. The working depth of this plow is determined by its angle of attack which can be positively and quickly changed in either direction. Additionally, when it is desired to raise the plow out of the ground, or lower it into the ground from transport position, the plow will automatically assume the correct angle, before any vertical movement in the ground, for quick penetration into, or easy removal from, the ground.

Having thus shown and described my invention, I claim:

1. In combination with a tractor; a hitch for mounting a free-floating plow to said tractor comprising upper and lower hitch links; two-way power lift means including a lost motion connection for raising said hitch and allowing said hitch to lower by gravity, a cam member pivotally mounted on said tractor and operatively connecting said power lift means to one of said hitch links to thereby shift the latter in a substantially axial direction when the power lift means is operated.

2. In combination with a tractor, a hitch for mounting a free-floating plow to said tractor comprising two lower link members extending rearwardly from said tractor and pivotally connected at their forward end at transversly spaced positions on the tractor, an upper link member, two-way power lift means including a lost motion connection for raising said hitch but allowing the latter to lower by gravity, cam means operatively connecting the forward end of said upper link member to said power lift means whereby said upper link will be moved in a substantially axial direction as the power lift means is operated.

3. The combination of a tractive vehicle and an implement to be drawn thereby, of a flexible hitch connecting said implement to said vehicle and including two laterally spaced lower links each pivotally connected to said vehicle and to said implement and an upper link pivotally attached to said implement at one end, two-way power lift means including a lost motion connection for raising said implement and allowing the latter to lower by gravity, a cam member pivotally connected to the tractor and operatively connecting the other end of said upper link to said power lift means whereby said upper link will be forced forwardly when said implement is lowered and forced rearwardly when raised.

4. In combination with a tractor, a hitch for mounting a free-floating plow to the tractor comprising two laterally spaced lower hitch links extending rearwardly from the tractor, an upper hitch link; a cam member pivotally connected intermediate its length to the rear end of said tractor and pivotally connected at one end to said upper link, two-way power lift means including a lost motion connection for raising said hitch and allowing the latter to lower by gravity and including a cam follower operatively associated with the other end of said cam member to vary the position of said upper link in a substantially axial direction when the power lift means is actuated.

5. In combination with a tractive vehicle; a hitch for mounting a free-floating plow to the tractor comprising, two laterally spaced lower hitch links extending rearwardly from the tractor, an upper hitch link; a cam member pivotally connected intermediate its length to the tractor and having a cam surface near one end thereof and pivotally connected at the other end to said upper link; two-way power lift means including a lost motion connection for raising said hitch and permitting the latter to lower by gravity and including a cam follower adapted to travel in said cam surface whereby the upper end of said cam member will be forced forwardly when said hitch is lowered and forced rearwardly when said hitch is raised.

6. In combination with a tractor; a two-way power lift means including a lost motion connection; two laterally spaced lower hitch links for connecting a plow frame to said tractor; an upper hitch link connected at its rear end to said frame; a cam member pivotally attached to the rear end of said tractor; said upper link being attached at its forward end to said cam member, said cam member having a first cam surface, said power lift means including a cam follower which cooperates with said first cam surface to move the upper link in a substantially axial direction when said power lift means is operated and said plow frame is in its working position.

7. The combination as set forth in claim 6 including; said cam member having a second cam surface with which the cam follower cooperates when the hitch is in the raised position to move the upper link substantially axially in a forward direction and thereby give the plow frame additional ground clearance for transport purposes.

References Cited in the file of this patent

UNITED STATES PATENTS

| Number | Name | Date |
| --- | --- | --- |
| 2,249,861 | Silver | July 22, 1941 |
| 2,324,840 | Hipple | July 20, 1943 |
| 2,354,886 | Silver | Aug. 1, 1944 |
| 2,455,727 | Bunting | Dec. 7, 1948 |